ACTIVATION PROCESS FOR ELECTROLESS NICKEL PLATING

Filed Dec. 13, 1968

INVENTOR
HANSPETER P.K. HENTZSCHEL

BY Gary C. Honeycutt

ATTORNEY 3,711,325

ACTIVATION PROCESS FOR ELECTROLESS NICKEL PLATING

Hanspeter Hentzschel, Richardson, Tex., assignor to Texas Instruments Incorporated, Dallas, Tex.

Filed Dec. 13, 1968, Ser. No. 783,667
Int. Cl. C23c *3/02*
U.S. Cl. 117—212 8 Claims

ABSTRACT OF THE DISCLOSURE

A silicon surface is prepared for electroless nickel plating by activation with an aqueous hydrofluoric acid solution containing from one to one hundred p.p.m. of ionic gold. Subsequent electroless deposition of nickel proceeds more uniformly over the entire silicon surface, and results in a more stable, tightly adhering nickel plate due to the improved activation step. Additional stability and even more reliable adhesion is obtained by a subsequent sintering of the composite structure above the gold-silicon eutectic temperature to alloy the gold activation film with the silicon. The sintering step is then preferably followed by a second electroless nickel plating step to build a nickel contact area of increased thickness.

This invention relates to electroless nickel plating of a substrate surface and more particularly to the fabrication of a semiconductor structure having one or more electrical contacts prepared by electroless nickel plating. An improved activation method is used which results in a more uniform nickel plate characterized by more reliable adhesion to the semiconductor surface.

Electroless nickel plating is a well-known technique. A typical plating bath consists of an aqueous solution of a nickel salt, such as nickel chloride, hexahydrate, and a soluble hypophosphite salt, such as sodium hypophosphite monohydrate, for example. Chemically, the process involves reduction of nickel ions by the simultaneous oxidation of hypophosphite ions. The plating solution is formulated with a concentration of nickel salt, a concentration of reducing agent, and a controlled acidity such that spontaneous reduction of the nickel is prevented. Since the initial increments of nickel plate exhibit a catalytic influence, additional deposits of nickel are limited to the desired surface, and therefore may be built up as thick as needed.

A particularly troublesome aspect of electroless nickel plating occurs immediately upon immersion of the substrate into the plating solution. If the initial deposition of nickel fails to cover the entire substrate surface, continued deposition proceeds with a serious lack of uniformity. An irregularity once created tends to persist throughout the entire plating operation. For example, in the fabrication of certain semiconductor devices, it is known to provide a monocrystalline silicon surface with a nickel electrode or electrodes by electroless plating. When a silicon slice is initially immersed in the plating solution, non uniform deposition of nickel may be caused by the presence of undetected traces of silicon oxide, or other contaminants, or may be caused by a tendency of the plating solution to oxidize the silicon surface before the initial formation of nickel plate. Any initial lack of uniformity is particularly harmful since the plating reaction evolves hydrogen gas which has a tendency to adhere by any unplated silicon surfaces thereby interfering with the deposition of nickel. It has therefore been recognized that in order to produce a uniform, mechanically stable nickel plate the deposition must start over the entire slice surface simultaneously upon immersion into the plating solution.

Accordingly, it is a primary object of the invention to prepare a substrate surface for electroless nickel plating in order to ensure that the initial deposition of nickel proceeds simultaneously over the entire exposed area thereof. More specifically, it is an object of the invention to provide an improved activation solution and activation process to be used in the preparation of a substrate for electroless nickel plating.

Still further, it is an object of the invention to provide a process for nickel plating a monocrystalline silicon body to form improved electrical contact means, and to provide a semiconductor device having improved electrical contact means prepared by electroless nickel plating.

One aspect of the invention is embodied in an activating solution for use in preparing a substrate to be nickel plated, consisting essentially of water, hydrofluoric acid, and 0.1 to 100 p.p.m. of ionic (trivalent) gold, preferably 1 to 20 p.p.m.

The invention is also embodied in a process for electroless nickel plating of a substrate which comprises contacting the substrate with an aqueous HF solution containing from 1 to 100 p.p.m. ionic gold, and then contacting the substrate with a nickel-plating solution.

The invention is further embodied in a method for providing a monocrystalline silicon body with means for electrical contact, beginning with the step of treating a selected surface of the silicon body with an activator solution consisting essentially of water, hydrofluoric acid, and from 1 to 100 p.p.m. ionic (trivalent) gold. The activator solution serves two essential functions: (1) to remove any oxide or other contaminants from the silicon surface, and (2) to deposit an extremely thin gold film on the silicon surface. The deposited gold film may have a thickness of only one atomic layer, and in any event, no thicker than ten atomic layers.

The treated silicon surface including the gold film is then contacted with a nickel plating solution in accordance with any known procedure for depositing an electroless nickel plate. Preferably, the activated substrate is transferred immediately from the activator solution to the plating solution without rinsing or prolonged exposure to air or other oxidizing atmosphere, in order to minimize the possibility of oxide formation. Once a nickel plate of the desired thickness is formed, the plated substrate is removed from the plating solution. The resulting plate has a superior uniformity and more reliable adhesion because the activation treatment of the invention permits the initial deposition to begin simultaneously over the entire area of the exposed substrate surface.

In accordance with a preferred embodiment, the adherence of the nickel plate is further improved by heating the composite structure above 370° C. for a time sufficient to alloy the gold film with the silicon substrate. Still further in accordance with the preferred embodiment, it is usually desirable, after the sintering step to return the plated srtucture to the nickel plating solution for the purpose of increasing the thickness of the nickel plate.

Still further, the invention is embodied in a semiconductor structure comprising a monocrystalline silicon body having an electrical contact thereon prepared by treating a selected surface of the silicon body with an aqueous activator solution containing hydrofluoric acid and from 1 to 100 p.p.m. ionic (trivalent) gold to form a thin gold film on the silicon surface, then contacting the treated surface with a nickel-plating solution to deposit a nickel plate thereon, and then heating the composite structure above 370° to alloy the gold film with the selected surface of the silicon body and thereby improve the adhesion of the nickel plate to the silicon body.

FIG. 1

Figure 1:
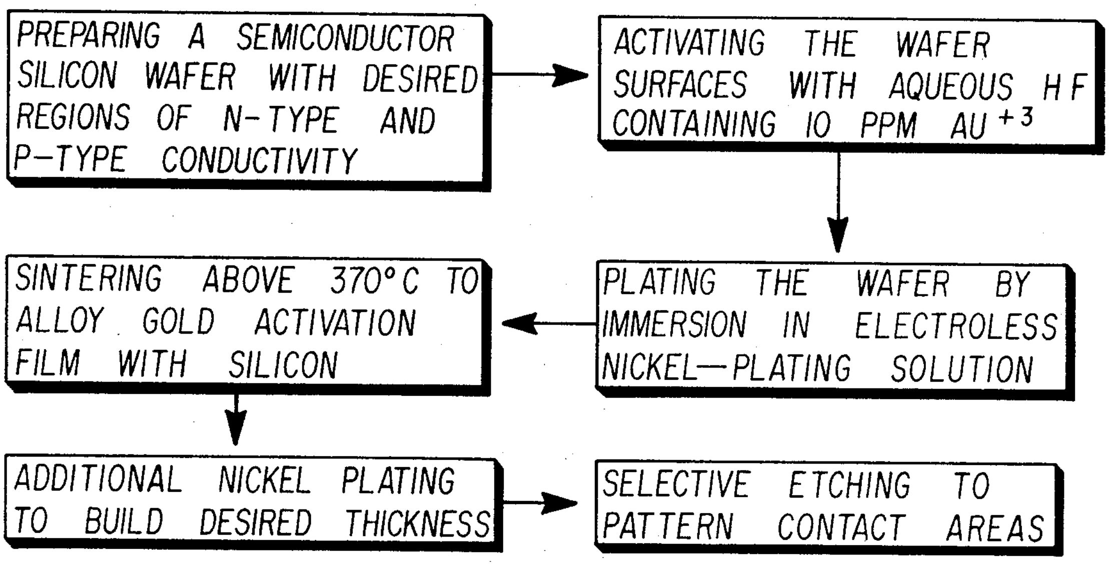
FIG. 1 is a block diagram showing the sequence of steps involved in a preferred embodiment of the invention.

As indicated in FIG. 1 the initial steps involved in the fabrication of a semiconductor device in accordance with a preferred embodiment of the invention involves the preparation of a semiconductor silicon wafer with the desired regions of N-type and P-type conductivity. A nickel plate formed to provide ohmic contact areas frequently must extend across regions of both N-type and P-type conductivity, having different doping levels. It is therefore essential to activate the surface in a manner that permits uniform initiation of the plating process over the entire wafer surface.

The wafer is then contacted with the activation solution of aqueous hydrofluoric acid containing from 0.1 to 100 p.p.m. ionic (trivalent) gold, preferably 1 to 20 p.p.m. which corresponds to about 0.000005 to 0.0001 mol per liter of gold chloride ($AuCl_3$), for example. Concentrations of gold above 100 p.p.m. could be tolerated, but this would impose additional restrictions on the process in order to avoid the deposition of excess gold, and would impair the effectiveness of the treatment. Using a solution containing 10 p.p.m. Au+3, for example, the activation step is conducted at room temperature for one to two minutes, which leads to the formation of a gold film having a thickness no greater than five to ten atomic layers, and perhaps as thin as one atomic layer. The activation solution contains from 5% to 40% by wt. hydrofluoric acid, and preferably from 15% to 25% by weight. The treatment removes any silicon dioxide that may be present on the silicon surface, and forms a very thin gold film which apparently renders the silicon surface more readily wettable by the nickel plating solution. No additional ingredients are required in the activation solution; however, it may be desirable to include a reducing agent, such as a hypophosphite salt, which will act to inhibit oxidation of the silicon surface. The reducing agent must not have sufficient strength to reduce the gold ions.

After the activation step, the wafer is contacted with an electroless nickel-plating solution. Such a plating solution is well known and generally consists of an aqueous solution of a nickel salt, such as nickel chloride hexahydrate, nickel chloride, nickel bromide or nickel acetate, and a watersoluble hypophosphite salt including, for example, potassium, lithium or sodium hypophosphite. Preferably, the concentration of nickel ions in the plating bath lies within the range of 0.1 to 0.2 mol per liter, while the concentration of hypophosphite ions preferably lies within the range of 0.1 to 0.3 mol per liter. The pH of the plating bath is preferably maintained between 4.0 and 9.0, and for optimim results between 6 and 8. The pH is typically adjusted with sulphuric acid and amonium hydroxide or sodium carbonate, for example.

The plating bath may contain other ingredients including, for example, glutamic acid or a water soluble salt thereof for the purpose of chelating or complexing the nickel in order to avoid the precipitation of nickel phosphite, without adversely affecting the nickel deposition rate. Other plating bath formulations are known to the art and may be employed within the scope of the present invention.

The plated wafers are then heated above 370° C. for a time sufficient to alloy the gold activation film with the silicon body thereby further improving the adhesion of the nickel plate to the silicon surface. Preferably, the sintering temperature is maintained within a range of 400° to 700° C. for a time of five minutes to one hour.

After sintering, the wafer is returned to an electroless nickel plating bath to build the thickness of nickel plate desired in the final structure. For example, a total nickel thickness of about two microns is preferred. The total plating time required to achieve such thickness is typically about four minutes, including both the first and final plating stages. Once the desired thickness of nickel is achieved, the wafer is processed by selective etching techniques to pattern the desired contact areas. Preferably, the selective etching is carried out by photolithographic techniques involving the application of a suitable resist composition photographically patterned to protect the selected nickel areas to be retained. A wafer containing the patterned photoresist composition is then contacted with a suitable etchant, for example, nitric acid, to remove the excess nickel plate. After etching, the photoresist layer is removed to complete the wafer processing.

After dicing the wafers, each semiconductor chip is further processed by soldering electrical leads to the appropriate contact areas. The mounting of each chip on a suitable header and packaging is completed in accordance with known procedures.

In accordance with an alternate embodiment of the invention, the initial nickel plating stage is continued until the desired thickness of about two microns is achieved, after which the wafer is processed by selective etching to pattern the desired contact areas. That is, the sintering and second nickel plating stages, indicated by FIG. 1, are omitted. Then, after dicing to separate the individual semiconductor chips, the attachment of electrical leads to the contact areas is completed by any suitable soldering technique. A further improvement is obtained, however, by conducting the soldering step above 370° C., whereby the gold activation film is alloyed with the silicon concurrently with the soldering step.

Also, sintering of the structure to alloy the gold activation film may be omitted altogether, but not necessarily with equivalent results.

FIG. 2

Figure 2:
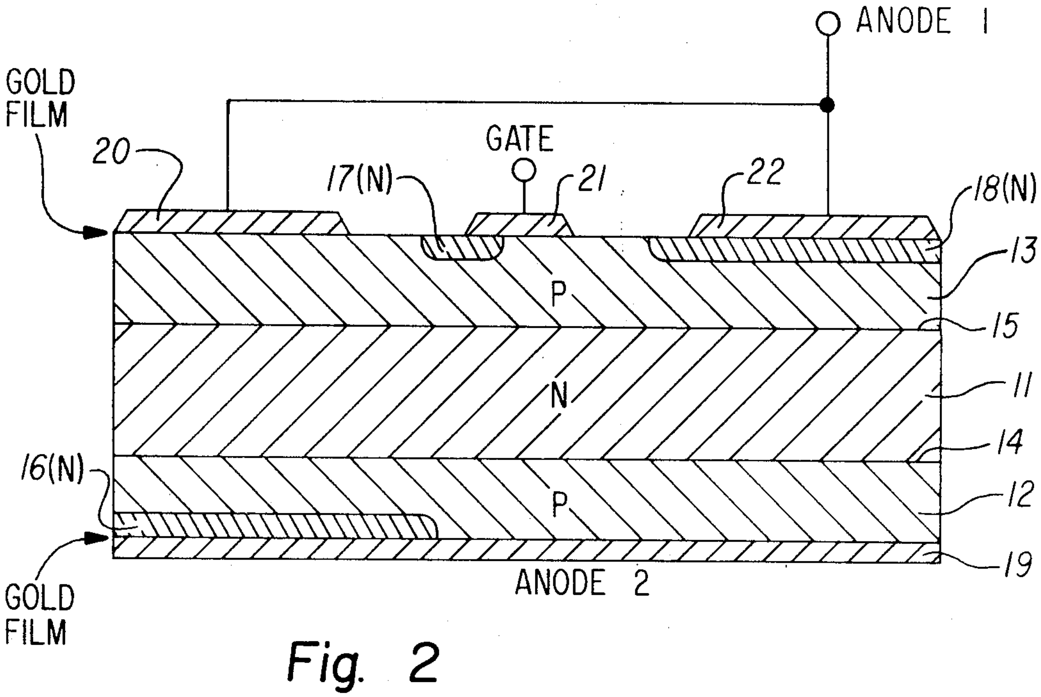
FIG. 2 is a cross section of an example of a semiconductor device provided with electrical contacts prepared in accordance with the invention.

The semiconductor structure illustrated by FIG. 2 is a bi-directional triode thyristor (triac) which may be triggered from the off-state to the on-state by either polarity of gate signal with anode 2 positive, or by negative gate signal with anode 2 negative. As will be apparent, the various N-type and P-type conductivity regions of the device may be prepared by diffusion of acceptor impurities including boron, for example, into the opposite surfaces of a silicon wafer 11 of N-type conductivity, thereby forming P-type regions 12 and 13, and junctions 14 and 15, respectively, followed by selective diffusion of donor impurities including phosphorous, for example, into regions 12 and 13 to form regions 16, 17, and 18, and the corresponding p-n junctions. Processing details for the various diffusion stages employed in the fabrication of such a device need not be described in detail for the purposes of the present disclosure, since these steps do not form a part of the present invention. That is, the invention is applicable to the formation of nickel-plated contacts on silicon structures of all kinds, including diodes, transistors, thyristors and others, regardless of the particular junction geometry contained therein. It is also applicable in the nickel plating of other semiconductor structures, including germanium, gallium arsenide, other III–V compounds, and other substrates wherein the above-noted nickel-plating problems occur.

Nickel-plated contact areas 19 through 22 are then added in accordance with the method of the invention. The gold activation film lies at the interface between the silicon body and the nickel-plated contact areas.

What is claimed is:

1. A process for electroless nickel plating of a semiconductor substrate which comprises contacting said substrate with an aqueous hydrofluoric acid solution containing from 0.1 to 100 p.p.m. Au+3, and then contacting said substrate with a nickel-plating solution.

2. A process as defined by claim 1 wherein said substrate is silicon.

3. A process as defined by claim 1 wherein said hydrofluoric acid solution contains from 5% to 40% by weight hydrofluoric acid and from 1 to 20 p.p.m. Au+3.

4. A process as defined by claim 1 wherein said nickel-plating solution comprises a nickel salt and a soluble hypophosphite salt.

5. A method as defined by claim 1 wherein said substrate is contacted with said hydrofluoric acid solution for a period of 1 to 2 minutes at ambient temperature.

6. A method as defined by claim 2 followed by the step of heating the resulting nickel-plated substrate to a temperature above 370° C. for a time sufficient to alloy the gold activation film with the silicon body.

7. A method for providing a monocrystalline silicon body with means for electrical contact which comprises:

(a) treating a selected surface of said body with an aqueous hydrofluoric acid solution containing from 0.1 to 100 p.p.m. Au+3 to form a thin gold film on said surface;

(b) then contacting the treated surface with a nickel-plating solution to deposit a nickel plate thereon; and (c) then heating the composite structure above 370° C. for a time sufficient to alloy said gold film with the silicon body and thereby improve the adhesion of said nickel plate to the silicon body.

8. A semiconductor structure comprising a monocrystalline silicon body having a gold film covering at least a portion thereof, and a nickel plate covering said gold film, said gold film having a thickness no greater than 10 atomic layers.

References Cited

UNITED STATES PATENTS

| | | | |
|---|---|---|---|
| 3,212,917 | 10/1965 | Tsu et al. | 117—54 |
| 3,442,683 | 5/1969 | Lenoble et al. | 117—54 |
| 3,336,160 | 8/1967 | Katz et al. | 117—130 X |

OTHER REFERENCES

Serota, Science for Electroplaters, Metal Finishing, October 1962, pp. 74–77.

RALPH S. KENDALL, Primary Examiner

U.S. Cl. X.R.

117—217, 54, 160; 106—1